United States Patent [19]

Evans

[11] 4,209,684
[45] Jun. 24, 1980

[54] FUSION TECHNIQUE OF ASSEMBLING ROTARY DRILL BIT AND ADJUSTING GAGE OF CUTTING ELEMENTS

[76] Inventor: Robert F. Evans, 631 Honeywood La., La Habra, Calif. 90631

[21] Appl. No.: 15,170

[22] Filed: Feb. 26, 1979

[51] Int. Cl.² .......................... B23K 15/00; B21D 3/16
[52] U.S. Cl. ................ 219/121 EM; 29/445; 148/130; 219/153; 228/182
[58] Field of Search ................ 228/182; 29/445, 464; 219/121 EM, 121 LM, 153; 148/130

[56] References Cited

U.S. PATENT DOCUMENTS

| | | | |
|---|---|---|---|
| 2,428,825 | 10/1947 | Arnoldy | 148/130 |
| 3,334,213 | 8/1967 | Sauve et al. | 219/121 EM |
| 3,769,102 | 10/1973 | Godin et al. | 148/130 |
| 3,907,191 | 9/1975 | Lichte | 228/182 |
| 3,987,859 | 10/1976 | Lichte | 175/375 |
| 4,043,411 | 8/1977 | Lichte | 175/369 |
| 4,045,646 | 8/1977 | Lichte | 219/121 EM X |
| 4,098,448 | 7/1978 | Sciaky et al. | 228/182 X |
| 4,127,762 | 11/1978 | Paton et al. | 219/121 EM |

*Primary Examiner*—Francis S. Husar
*Assistant Examiner*—Kenneth J. Ramsey
*Attorney, Agent, or Firm*—John R. Ley

[57] ABSTRACT

A high energy electron or laser beam is preferably used to assemble a drill bit. Bit segments are integrally adjoined together to form the drill bit assembly. Abutting confronting faces of the adjoining bit segments are aligned parallel to the drill bit axis and are fused together. The parallel alignment significantly simplifies the beam fusion process. The gage of the gage cutting elements of the bit segments is adjusted independently of the process involving assembly of the bit segments. Metal in a leg portion of the bit segments is fused in a zone of predetermined configuration to adjust the gage of the gage cutting elements. The zone of fused metal applies thermal contraction to the leg portion or permanently sets or relieves induced strain forces in the leg portion to permanently deflect the leg portion to a desired position at which the proper gage is obtained.

22 Claims, 6 Drawing Figures

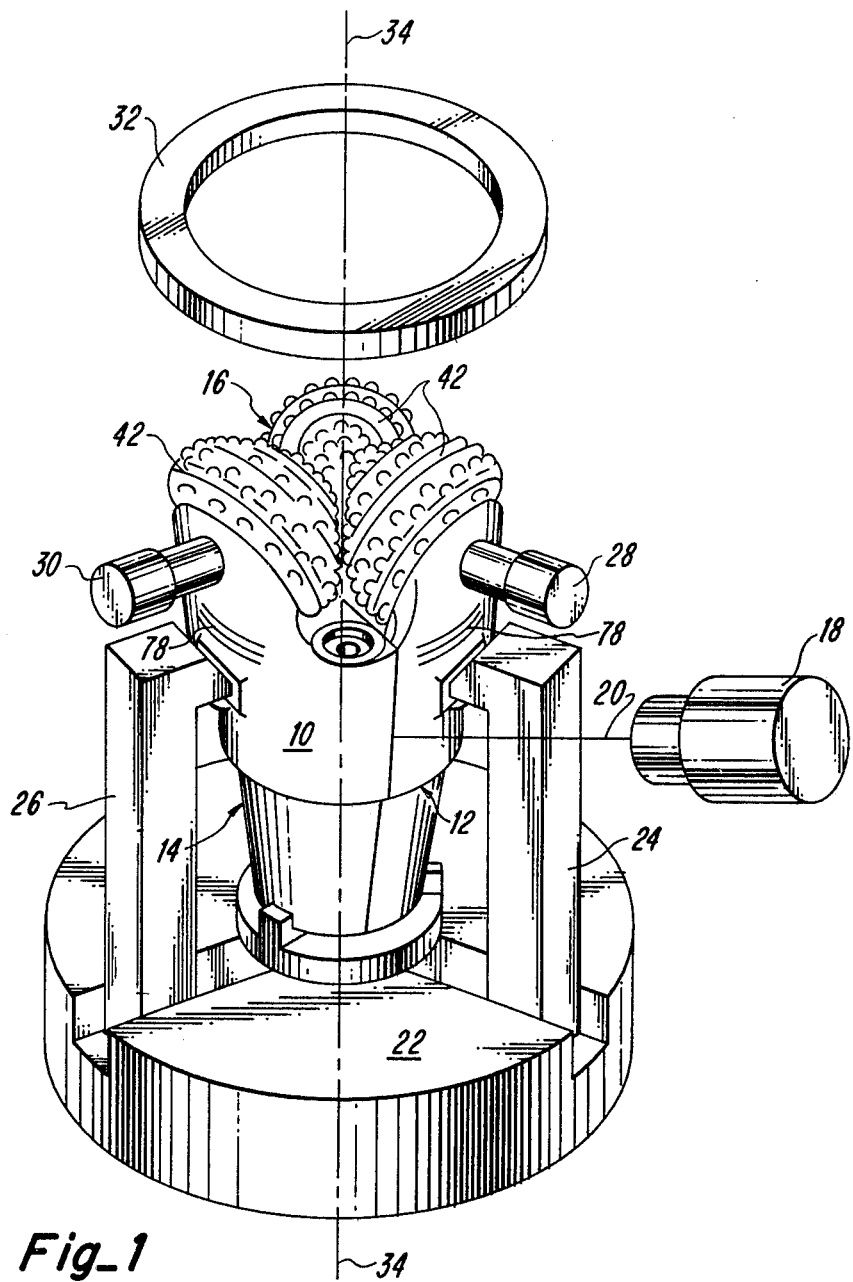
Fig_1

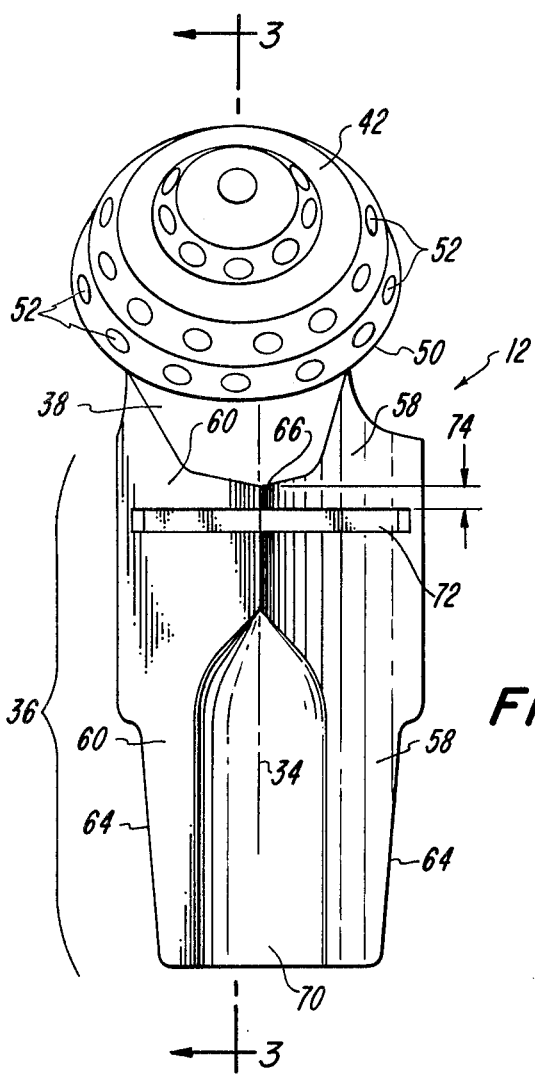
Fig_2
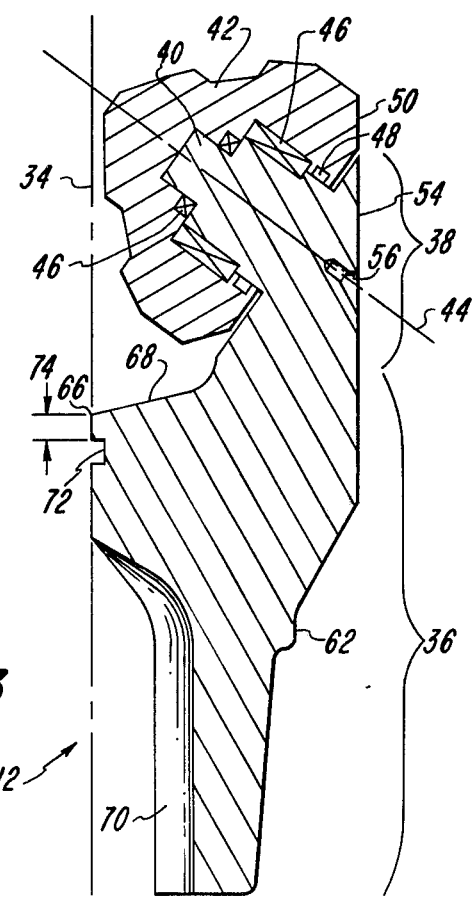
Fig_3

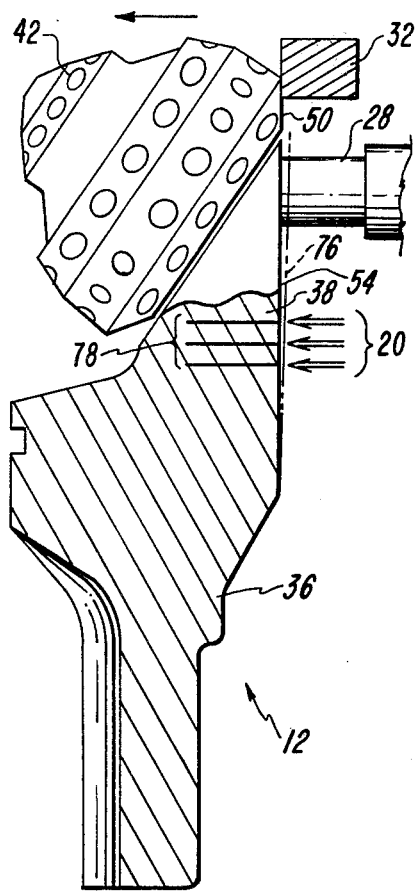
Fig_4
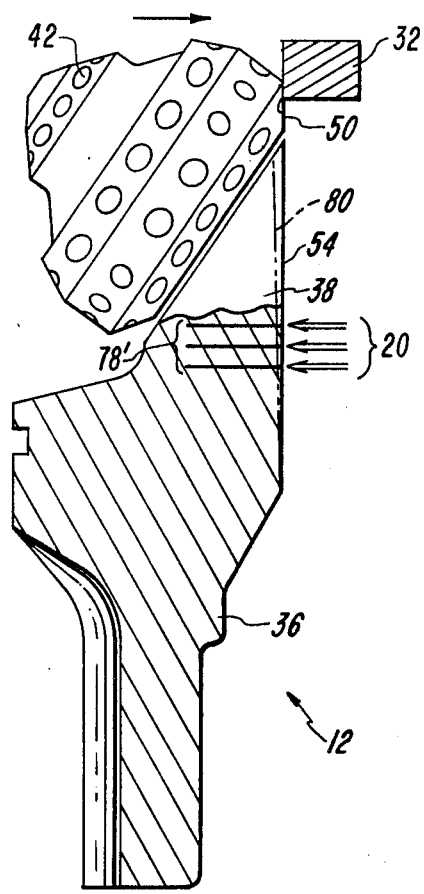
Fig_5
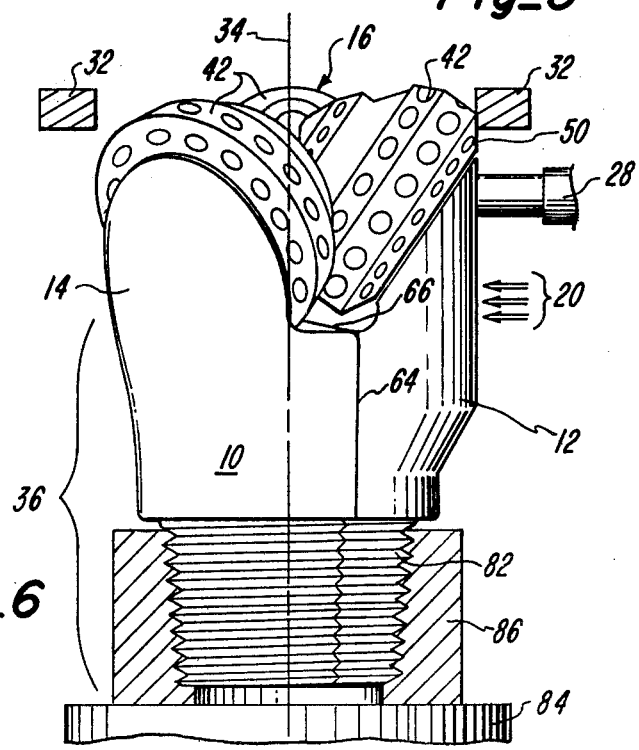
Fig_6

FUSION TECHNIQUE OF ASSEMBLING ROTARY DRILL BIT AND ADJUSTING GAGE OF CUTTING ELEMENTS

BACKGROUND OF THE INVENTION

1. Field of the Invention

This invention relates to the assembly of rotary drill bits, and more particularly to a technique preferably employing a high energy beam to fuse drill bit segments together and to adjust the cutting elements of the drill bit to a precise and predetermined gage.

2. Introduction and Brief Description of Prior Art

Traditionally, rotary drill bits have been formed by joining a plurality of separately formed bit segments into an integral drill bit assembly. For many years the drill bit segments were joined together by welding processes using filler material. Recently, high energy electron and laser beams have been employed for fusing the bit segments together. Exemplary disclosures of high energy beam fusing techniques are found in U.S. Pat. Nos. 3,907,191; 3,987,859; 4,043,411; 4,045,646; 4,054,772; and 4,098,448. The disclosures contained within these patents are incorporated herein by this reference.

The high energy beam fusing technique possesses many significant advantages. One significant advantage is that the bit segments are more completely joined together by beam fusion than by conventional welding processes. One disadvantage of the beam fusing technique is that significant difficulty has been experienced in positioning the bit segments relative to one another to obtain a precise gage or cutting diameter of the cutting elements of the assembled bit. In the prior art welding technique, filler material could be added between the confronting faces of the bit segments during assembly to obtain the proper gage. However with the electron beam technique no filler material can be utilized since the abutting and confronting faces of the bit segments must be directly fused together by the high energy beam.

The recognized procedure to attempt to obtain the proper gage, as exemplified by the aforementioned patents, is to scissor the separate bit segments until a desired gage is obtained. Scissoring the segments causes the abutting and confronting faces to skew slightly with respect to the axis of the resulting bit. Since the high energy beam fusing technique occurs within a vacuum chamber and is completely mechanically controlled, the fixture for holding and positioning the assembled drill bit segments must have the capability of aligning the skewed, abutting confronting segment faces with the path of the high energy beam. Consequently the positioning fixture and its associated operating means must be capable of very complex directional movement and rotational orientation to correctly position the confronting segment faces to thoroughly fuse them together. The tedious nature and complexity of the mechanisms required for positioning the abutting confronting faces, which become the fused seams in the assembled drill bit, and the loss of efficiency of bit assembly during the complex positioning process, are significant problems in the prior art. The cost of maintaining the extreme precision of manufacturing processes to allow the segments to be joined with the confronting faces abutting and yet produce the proper gage diameter is prohibitive.

Although the scissoring technique has been adequately successful in positioning the cutting means of said drill bit segments at a predetermined gage, the scissoring technique changes such important constraints and dimensions as the journal angle, the offset angle, and the cutter element vertical location on the assembled drill bit. The journal angle, offset angle, and particularly the cutter vertical location are very important in obtaining acceptable performance of the drill bit over an extended lifetime of use.

Other prior art of interest relative to the present invention is a known manual technique of "pulling bits to gage". Pulling bits to gage has been practiced for many years as a salvage method for drill bits which, when assembled, did not obtain acceptable gage tolerances. Essentially, pulling bits to gage is a hand welding technique in which a zone of metal was melted into the back arcuate surface of the leg portion of the drill bit. When the melted zone of metal cooled, thermal contraction resulted and the leg portion was deflected outward. The cutting elements attached to the leg portion were thus also moved outward. Through skill and experience, the individual practicing this technique might obtain acceptable results in moving the cutting elements to within a desired range of gage tolerances. However, results were typically erratic due to the inability to determine the amount and configuration of the zone to be welded or melted and the inability to correlate the amount of shrinkage in the melted zone to the desired amount of gage adjustment. Also, the relatively imprecise control over the metallurgical effects created has sometimes resulted in serious imperfections and deficiencies in structural strength characteristics of the drill bit material. The penetration depth of certain prior art welding processes is severely limited, and unlike electron or laser beam techniques, the welding processes are effective only at or near the surface of the joined materials.

Other techniques, disadvantages and limitations in the prior art are known. Those skilled in the art may recognize still further limitations and disadvantages in view of the desirable aspects of the present invention, but comprehension of the desirable aspects of this invention should not diminish the significance of many previous troublesome limitations in the prior art.

SUMMARY OF THE INVENTION

The present invention provides a new and improved technique for assembling rotary drill bits by fusing bit segments together such that a predetermined gage is obtained and such that the abutting confronting faces of the bit segments are aligned parallel with the axis of the drill bit. According to certain broad aspects of the invention, each bit segment is separately formed with the confronting faces at angles adapted to abut adjoining bit segments of the integral bit assembly while simultaneously providing the journal and offset angles at desired values. The bit segments are positioned together with the abutting confronting faces of adjoining bit segments extending parallel to the axis of the drill bit. The segments are shifted longitudinally with respect to one another to locate all cutting elements at the same predetermined vertical location. The segments are conveniently joined together by fusing the material along the abutting confronting faces. Since the confronting faces are parallel to the bit axis, complex orientation and movement is not required. The assembled bit segments are quickly rotated to position each set of confronting faces in alignment with the high energy beam trajectory and path. After welding the bit segments, a zone of metal within a leg portion of each bit segment is fused in a controlled and predetermined manner to permanently deflect the leg portion to a position at which the cutting means attains the desired and predetermined gage. Fusing the metal within the zone occurs by directing the high energy beam on the leg portion, and correlating the configuration of the zone with the metallurgical effects desired. An elastic deflecting force is applied to the leg portion prior to fusing the metal within the zone. Fusing the metal within the zone into the plastic range relieves stresses. The elastic deflection is converted into permanent deflection and the cutter means are permanently positioned at the desired gage. Alternatively to increase the gage of the cutter means, a zone penatrating inwardly from the back surface of the leg portion is fused. The depth of penetration and configuration of the fused zone is controlled and correlated so that thermal contraction will pull or force or permanently deflect the leg portion radially outward.

By adjusting the gage by fusing the zone of metal, the bit segments need not be scissored or skewed. The assembly speed and efficiency is thus increased and the complexity of the assembly fixtures and control apparatus is reduced. The vertical location of the cutter means is conveniently adjusted to a single position by longitudinally moving the separate bit segments prior to assembly and fusion. The journal angle and offset angle are maintained in the desired configuration, because these angles are set during formation and machining of the bit segments and are not changed by skewing the bit segments during assembly.

A more complete understanding of the invention, as well as its significant advantages and features, can be obtained from the following detailed description of the preferred embodiment described in conjunction with the drawings briefly described below.

BRIEF DESCRIPTION OF THE DRAWINGS

FIG. 1 is a perspective view of a rotary drill bit being assembled according to the concepts of the present invention. The rotary drill bit is illustrated in an inverted position with the rotational axis extending vertically. Also illustrated in FIG. 1 are various apparatus utilized during assembly of the drill bit, including means for emitting a high energy beam, a positioning fixture, force applying apparatus, and a gaging ring illustrated axially spaced from the drill bit.

FIG. 2 is a vertical elevation view of a drill bit segment of the rotary drill bit shown in FIG. 1. The drill bit segment is illustrated in FIG. 2 looking radially outward from the rotational and center axis of the drill bit.

FIG. 3 is a section view taken substantially in the plane of line 3—3 of FIG. 2.

FIG. 4 is a generalized and partially sectioned view similar to FIG. 3 illustrating the permanent deflection of a leg portion of the bit segment radially inward to locate the cutting means at a slightly reduced radial position and at a predetermined desired gage, and also illustrating the gaging ring in section.

FIG. 5 is a view similar to FIG. 4 illustrating the permanent deflection of a leg portion of the bit segment radially outward to locate the cutting means at a predetermined desired gage.

FIG. 6 is a side elevational view of a rotary drill bit retained in a fixture, with a portion shown in section, illustrating another technique of adjusting the gage of the bit.

DESCRIPTION OF PREFERRED EMBODIMENT

A rotary drill bit 10 of the well known three cone design is illustrated in assembled relationship in FIG. 1. As is traditional in this art, a drill bit is formed from a plurality of permanently joined together bit segments. In the three cone rotary drill bit 10 illustrated, three bit segments 12, 14 and 16 are assembled to form the drill bit 10. Permanent assembly occurs by welding or fusing the segments together, preferably by a gun device 18 for emitting a very high energy electron or laser beam 20. A conventional fixture 22 is utilized to hold the bit segments in assembled relationship during fusion. The fixture 22 includes pivotable arm devices 24 and 26 (and another not shown) for contacting the bit segments. Means 28 and 30 are also operatively associated with the fixture 22 for applying force to portions of the bit segments, as will be more completely described. A gaging ring 32 is operatively associated with the fixture 22 and is positioned concentrically with respect to a rotational and central axis 34 of the assembled drill bit 10 by conventional means (not shown).

The major features and elements of each bit segment, exemplified by segment 12, are illustrated in FIGS. 2 and 3. The bit segment 12 includes a shank portion 36, a leg portion 38 extending longitudinally from the shank portion 36, and a journal pin or axle shaft 40 extending from the leg portion 38. The journal pin 40 operatively and rotationally attaches a cone cutter wheel 42 or cutter means to the bit segment 12. The journal pin 40 is concentric about a journal axis 44, and the journal axis 44 extends at a predetermined acute intersecting angle with respect to the bit axis 34. Bearings 46 rotationally attach the cutter wheel 42 to the journal pin 40. A seal 48 holds lubricant for the bearings 46 between the journal pin and the interior of the cutter wheel 42. A conventional lubricant reservoir (not shown) is included within each bit segment for replenishing the lubricant to the bearings 46. The cutter wheel 42 is of known cone like configuration and includes a gage cutting surface 50. The gage cutting surface 50 cuts and defines the gage or maximum diameter of the bore hole cut by the rotary drill bit. A plurality of cutting inserts 52, typically formed of tungsten carbide, are bonded to the cutter wheel 42. Rotation of the cutter wheel in contact with an earth formation causes the inserts 52 to cut and otherwise break the earth material and form the bore hole.

The leg portion 38 includes a back or radially outside arcuately curved surface 54. The surface 54 is positioned slightly radially inward with respect to the gage cutting surface 50 of the cutter wheel 42. Thus the back surface 54 of the leg portion does not contact the cylindrical side wall of the bore hole during drill bit rotation. A nonconventional element preferably formed in each bit segment is a center drill 56 formed inward from in the back surface 54. The center drill 56 is concentric about the journal axis 44, and is employed for purposes of the present invention as exemplary reference means for aligning the journal pins 40 and cutter wheels 42 at a desired axial or longitudinal location during bit assembly, as will be explained in more detail.

Each bit segment is formed with a pair of confronting faces 58 and 60 on the shank portion 36. The confronting faces are angled at 120° with respect to one another for a conventional three cone bit. Each of the confronting faces 58 and 60 is planar and is adapted to parallely abut and confront a correspondingly shaped confronting face of an adjoining bit segment, upon assembly of the drill bit. Each of the confronting faces 58 and 60 is machined to extend parallel to the rotational axis 34 of the assembled drill bit. The confronting faces 58 and 60 intersect an outer exterior surface 62 of the shank portion 36 at longitudinal edges 64 and a transversely extending dome edge 66. The upper interior surface of the shank portion extending from the dome edge 66 to the leg portion 38 defines a dome 68. An interior channel 70 is formed parallel to the axis of the bit, and when the bit segments are assembled as the drill bit, the channels 70 collectively define an internal passageway through which drilling fluid is emitted from jets (not shown) on to the drill face of the bore hole to carry away the particle cuttings.

A nonconventional feature of the shank portion 36 of the bit segment is a notch 72 formed concavely into the confronting surfaces 58 and 60. The notch 72 extends generally transversely with respect to the bit axis 34 and generally parallel to the dome edge 66 and dome 68. The notch 72 is spaced a predetermined axial distance 74 from the dome edge 66. The amount of material encompassed in the distance 74 is determined so that complete fusing of the confronting faces 58 and 60 over the distance 74 occurs as will be explained subsequently.

The bit segments are formed of known metallic materials and are typically forged. The journal pin is formed with its journal axis 44 extending at a predetermined journal angle and offset angle if desired. The confronting faces 58 and 60 are machined. The various angles and configurations of the confronting faces, the journal and offset angles of the journal pin and outside surfaces 54 and 62, are all formed to desired tolerances and predetermined relationships with one another and with respect to the drill bit axis 34 to achieve a proper drill bit assembly. Arranged thusly, the plurality of assembled bit segments can be shifted axially or longitudinally with respect to one another prior to fusion without altering the offset or journal angle of the cutter wheel 42. When assembled, the shank portions 36 form an integral shank of the drill bit.

The technique and method of assembling the rotary drill bit 10, which includes a method of permanently positioning the cutter wheels 42 with the gage cutting surfaces 50 at a predetermined and desired gage, can be understood primarily from FIGS. 1, 4 and 5. After the bit segments have been formed in the manner previously described, a predetermined plurality of bit segments necessary to form an integral drill bit assembly are positioned in the fixture 22. In the three cone bit 10, the three segments 12, 14 and 16 are utilized. The confronting faces 58 and 60 of the bit segments are abutted to the confronting faces of the adjoining bit segments. The arm devices, e.g. 24 and 26, of the fixture 22 contact the back surfaces 54 of the bit segments and hold the segments in adjoining and abutted relationship. Each of the planar confronting faces 58 and 60 is aligned parallel with the axis 34 of the bit. Parallel alignment of the confronting faces is easily attained because the confronting faces 58 and 60 are machined to a predetermined planar configuration and close tolerance necessary for easy parallel alignment with the bit axis 34. Minor adjustments are easily achieved by pivoting each of the arm devices 24 and 26 until the parallel alignment occurs. Due to the machined tolerance and configuration of the confronting faces, parallel alignment also positions the back surfaces 54 of each of the bit segments generally in a smooth circular arc with very small or no discontinuities at the seam points where the longitudinal edges 64 of adjoining bit segments confront one another.

Prior to or simultaneously with the operation of aligning the confronting faces parallel to the bit axis, the bit segments are longitudinally or axially shifted or adjusted with respect to one another to collectively position all of the journal pins 40 at the same relative longitudinal location. Longitudinal adjustment is conveniently achieved by use of the center drills 56. A conventional positioning jig (not shown) includes conventional elements for registering with or extending into the center drills 56. Upon registration, the positioning jig is arranged with respect to the drill bit axis 34 and the fixture 22 to assure that the journal axis 44 of each bit segment intersects or is referenced to the bit axis 34 at the same point. Thus, each journal pin 40 and its operatively connected cutter wheel 42 is positioned at the same longitudinal or axial location with respect to one another in the assembled drill bit.

After retention in the manner described, the bit segments are fused together by melting together the material of the adjoining confronting faces of the bit segments. Fusing occurs by directing the high energy beam 20 from the gun device 18 onto the abutting confronting faces. Each pair of planar abutting confronting face is aligned parallel to the beam 20, with alignment occurring due to rotation of the fixture 22 and not because of complex three dimensional and rotational movement as is required in the prior art. After alignment, the beam traverses or zig zags radially over an area adjoining each abutting confronting face, thus melting together the material of the adjoining bit segments at the adjoining confronting faces. Conventional control devices (not shown) associated with the gun device 18 are programmed to move the gun 18 so that the beam 20 fuses the full extent of the confronting faces. After each seam along a pair of confronting faces is completed, the fixture 22 rotates to position the next pair of abutting confronting faces in planar alignment with the beam 20 so that fusion can be accomplished.

Dome seams defined by the abutting confronting faces at the dome edges 66 are likewise fused, either simultaneously with each longitudinal seams along the longitudinal edges 64, or after all of the longitudinal seams have been fused. The abutting confronting faces at the dome edges 66 are parallel to the abutting confronting faces at the longitudinal edges 64 and can be fused as a continuation of the longitudinal seams without rotating the fixture 22. Because the cutter wheels 42 have been previously attached to each bit segment, the beam 20 cannot impinge on the dome edges of the bit shank directly incidently, i.e. approximately perpendicular to the dome edges 66. To avoid contact with the cutter wheels, the beam 20 must angle beneath the cutter wheels and consequently impinges on the dome seams at an acute angle of low incidence. The low incidence angle forces the high energy beam to penetrate through an increased amount of material at the dome edges 66. To assure complete fusion at the dome seams, the notches 72 are formed in a predetermined position to assure that complete fusion occurs over the amount of confronting face material defined by distance 74, even at the low incidence angle of the high beam 20.

The gage cutting elements or surfaces 50 of the cutter wheels 42 are next permanently adjusted to attain a predetermined and desired gage for the drill bit. Gage adjustment occurs independently of the assembly of the bit segments, in contract to the prior art. One method of permanently adjusting and over-gage cutter wheel to a reduced desired gage is illustrated by FIG. 4. One force applying means 28 contacts the back surface 54 of the leg portion 38 of the bit segment 12. While the assembled drill bit is held firmly in the fixture 22, the force applying means 28 applied sufficient force to elastically deflect the leg portion slightly radially inward. The dashed lines 76 indicate the prior position, thus showing the amount of slight inward elastic deflection. With the proper amount of deflection, the gage cutting surface 50 contacts or fits in close reference adjacency to the gaging ring 32, which has been lowered toward the drill bit from its position shown in FIG. 1. Of course, deflection by the force applying means 28 creates metallurgical stress within the leg portion, predominantly in an area of the leg portion 38 between the shank portion 36 and the journal pin 40. To permanently position the leg portion 38 at its radially-inward, elastically-deflected position, the beam 20 is directed onto the leg portion in the area or zone 78 in which the elastic strains are primarily located. The beam 20 penetrates radially inward from the outside surface 54 and melts or otherwise fuses the metallic material of the bit segment into the plastic range, thereby relieving the elastic stresses induced. The leg portion 38 attains a permanent set or deformation at the position which obtains the desired gage. The depth of penetration of the zone 78 extends from the outer back surface 54 radially inward a predetermined amount determined by the energy or beam current within the beam 20. The amount of penetration and energy of the beam is readily controlled by conventional electronic energizing arrangements associated with the gun device 18. The ability to precisely control the beam energy achieves desired and controlled metallurgical effects within the zone. The zone 78 also extends circumferentially along at least a portion of the outside surface 54 of each leg portion, as is shown in FIG. 1. The configuration of the zone, as to its extent of radially inward penetration, circumferential extension, and axial extension, as well as the position on the leg portion where the zone 78 is fused, are appropriately controlled according to the type of material from which the bit segment is made, the amount of elastic deformation, and other factors known in the art or readily apparent from practice of the present invention.

Another method of adjusting the gage when the gage cutting elements are under-gage is illustrated by FIG. 5. Dashed lines 80 indicate the previous position of the back surface 54 of the leg portion 38, prior to adjustment. To achieve the adjusted position illustrated by the solid lines, a zone 78' is fused into the leg portion 38 at a position intermediate the journal pin 40 and the shank portion 36, by the high energy beam 20. As the metal within the fused zone 78' cools, it contracts. The thermal contraction applies an internal force within the leg portion near the back surface 54 which permanently deflects the leg portion radially outward. The amount of outward deflection is determined by the configuration of the zone 78'. The amount of radial outward deflection necessary to move the gage cutting surface 50 to the desired gage, as defined by the gaging ring 32, determines the configuration and characteristics of the zone. The complete zone 78' need not be fused at one time, but may be fused in stages with the amount of fusion created during each stage depending upon the amount of further outward deflection desired from the leg segment 38. Accurate control over the configuration, characteristics, amount of thermal contraction and metallurgical effects of the fused zone 78' are possible by precisely controlling the thermal energy of the beam 20. Such control was never possible in the prior art, because of the inability to obtain the precise controlled localized fusion effects possible with a high energy electron or laser beam.

Another technique of adjusting the gage radially outward is similar to that described in conjunction with FIG. 4. Appropriate force applying means are attached to the leg portion 38 to elastically deflect the leg portion radially outward. After elastic deflection the high energy electron beam fuses the zone of metal to relieve the elastic deflecting stresses and thereby permanently deflect the leg portion to the appropriate position.

By fusing the dome seams of the shank portions 36 after the zone of metal within each leg portion 38 has been fused, the leg portions can be deflected slightly radially inward if desired. The thermal contraction resulting from the cooling of the dome seams applies a slight inward radial force to the leg portions, thus moving the gage cutting elements of the cutter wheel slightly radially inward. The notch 72 allows the fused dome seams to pivot the leg portion slightly inward.

A further method of adjusting the gage of the cutting elements to obtain precise bit geometry is illustrated in FIG. 6. The bit segments 12, 14, and 16 have previously been retained in an appropriate fixture, longitudinally shifted to position the cutter wheels 42 at the same relative axial position, and have thereafter been fused together by melting material of the adjoining confronting faces of the bit segments by a high energy beam, in the manner previously described. Material along all longitudinal seams defined at the longitudinal edges 64 of the shank portion 36 is fused. Material along the dome seams defined by the dome edges 66 may be fused before or after gage adjustment occurs. After fusion along at least the longitudinal seams has occured, a conventional tapered threaded end connection 82 is machined or formed on the integral bit shank portion. The bit 10 is then attached to and retained in a positioning fixture 84 during gage adjustment. The fixture 82 includes a threaded sleeve 86 into which the threaded end connection 82 of the bit is threaded. By retaining the drill bit 10 in referenced relation to its threaded end connection 82, the rotational and center axis 34 is precisely determined for gage adjustment purposes. The gaging ring 32 is precisely located relative to the axis 34. With the axis 34 and gaging ring 32 precisely located, each of the cutter wheels 42 is adjusted to the desired gage by one of the fusing methods previously described. Adjustment in this manner assures that each of the cutter wheels will traverse the same circular path coaxial with the rotational axis 34 of the drill bit. By this adjustment method chucking errors in machining the threaded end connection 82 with respect to the gage surfaces 50 of the cutter wheels 42 are minimized, as compared to a method in which the threaded end connection 82 is machined after the gage has been adjusted.

One of the significant advantages of the high energy beam method of adjusting the gage cutting elements to a desired gage is that a high degree of control and desired results can be obtained. Since the energy of the beam is precisely controlled through electronic devices such as computers, highly accurate control over the amount and configuration of metal fusion results. Furthermore the concentrated energy of the beam creates the desired metal fusion effects at limited areas thus restricting the thermal energy added to the drill bit to those limited areas. The restricted amount of thermal energy does not destroy or otherwise adversely affect the cutting elements of the drill bit, particularly the seals 48 (FIG. 3) which can be easily damaged by excessive heat. More complete fusion of the metal occurs and superior metallurgical effects result when high energy beam fusion techniques are employed. Consequently, a stronger and more durable drill bit assembly is obtained. By adjusting the gage in a separate process or step independent of the bit asembly, the abutting confronting faces of the bit segments can be easily aligned parallel to the axis of the drill bit for convenient and economical fusion by the high energy beam. Thus the elaborate movement control and indexing apparatus necessary in the prior art technique of scissoring or skewing the bit segments is eliminated. Drill bits can thus be manufactured more economically because of the reduced cost of the assembly apparatus. By avoiding scissoring or skewing the bit segments, precise adjustment over the longitudinal or axial position of the cutter elements and the journal and offset angles result, which also was not possible in the prior art. Many other advantages are apparent to those comprehending the significance of the present invention.

Preferred technique of the present invention has been described with a degree of particularity, as have been its significant advantages and features. It should be understood, however, that the degree of specificity is not intended to restrict the spirit and scope of the invention or the definition thereof in the appended claims.

I claim:

1. A method of permanently positioning cutting means on a rotary drill bit at a predetermined desired gage; said drill bit being substantially formed of metallic material and comprising an integral shank, and at least one leg portion extending longitudinally from the shank, and attachment means operatively connecting said cutting means to said leg portion; said method comprising:
   applying deflecting force to said leg portion, and
   fusing the metallic material in a zone on said leg portion by directing a high energy beam on said leg portion, said zone extending inward from a surface of said leg portion and extending circumferentially within at least a portion of said leg portion, said zone further being positioned axially intermediate the shank and the attachment means,
   said fused zone of metal creating a permanent metallurgical effect within said zone to permanently deflect the leg portion to a position at which said connected cutting means attains the predetermined gage.

2. A method of permanently positioning cutting means on a rotary drill bit at a predetermined gage; said drill bit being substantially formed of metallic material and comprising an integral shank, and at least one leg portion extending longitudinally from the shank, and attachment means operatively connecting said cutting means to said leg portion; said method comprising:
   elastically deflecting the leg portion to a position at which the cutting means attains a predetermined gage, and thereafter
   fusing the metallic material in a zone on said leg portion by directing a high energy beam on said leg portion, said zone extending inward from a surface of said leg portion and extending circumferentially within at least a portion of said leg portion, said zone further being positioned axially intermediate the shank and the attachment means,
   said fused zone of metal creating a permanent metallurgical effect within said zone to permanently deflect the leg portion to a position at which said connected cutting means attains the predetermined gage.

3. A method as recited in claim 2 further comprising:
   applying radial force to the leg portion to elastically deflect the leg portion.

4. A method as recited in claims 1 or 2 utilized as part of a method of manufacturing a rotary drill bit from a plurality of bit segments, each bit segment including a shank portion forming a part of the integral shank of the assembled drill bit, each bit segment further including confronting faces on the shank portion adapted to abut corresponding confronting faces on another adjoining bit segment, comprising:
   fusing the bit segments together over at least a portion of the confronting faces by directing a high energy beam over the abutting confronting faces of adjoining bit segments, prior to fusing the material in said zone.

5. A method as recited in claim 4 wherein the abutting confronting faces of the shank portions of the bit segments define longitudinal edges extending generally longitudinally of the drill bit axis and dome edges extending generally transversely of the drill bit axis, and said method further comprises:
   fusing the confronting faces along the longitudinal edges prior to fusing the confronting faces along the dome edges.

6. A method as recited in claim 4 further comprising:
   positioning the confronting faces along the longitudinal edges in essentially parallel relation with the axis of said drill bit, prior to fusing the bit segments together at the confronting surfaces.

7. A method of permanently positioning cutting means on a rotary drill bit at a predetermined desired gage as part of manufacturing of the drill bit; said drill bit comprising a plurality of bit segments of metallic material; each bit segment comprising a shank portion forming a part of the integral shank of the assembled drill bit, and a leg portion extending longitudinally from the shank portion, and attachment means operatively connecting said cutting means to said leg portion; each bit segment further comprising confronting faces on the shank portion adapted to abut corresponding confronting faces on another adjoining bit segment, the abutting confronting faces on the shank portions defining longitudinal edges extending generally longitudinally of the drill bit axis and dome edges extending generally transversely of the drill bit axis; said method further comprising:
   forming a concave notch into a confronting face of each bit segment extending generally in alignment with the dome edge and spaced generally axially from the dome edge;
   fusing the bit segments together over at least a portion of the confronting faces by directing a high energy beam over the abutting confronting faces of the adjoining bit segments, the confronting faces along the longitudinal edges being fused prior to fusing the confronting faces along the dome edges; and
   fusing the metallic material in a zone on said leg portion by directing a high energy beam on said leg portion, said zone extending inward from a surface of said leg portion and extending circumferentially within at least a portion of said leg portion, said zone further being positioned axially intermediate the shank and the attachment means, said fused zone of metal creating a permanent metallurgical effect within said zone to permanently deflect the leg portion to a position at which said connected cutting means attains the predetermined gage.

8. A method of permanently positioning cutting means on a rotary drill bit at a predetermined gage as part of manufacturing of the rotary drill bit; said drill bit comprising a plurality of bit segments of metallic material; each bit segment comprising a shank portion forming a part of an integral shank of the assembled drill bit, and a leg portion extending longitudinally from the shank portion, and attachment means operatively connecting said cutting means to said leg portion; each bit segment further comprising confronting faces on the shank portion adapted to abut corresponding confronting faces on another adjoining bit segment of the assembled drill bit, the abutting confronting faces of the shank portions of the bit segments defining longitudinal edges extending generally longitudinally of the drill bit axis and dome edges extending generally transversely of the drill bit axis; said method comprising:

fusing the bit segments together over at least a portion of the confronting faces by directing a high energy beam over the abutting confronting faces of the adjoining bit segments;

fusing the confronting faces along all of the longitudinal edges prior to fusing any of the confronting faces along the dome edges; and fusing the metallic material in a zone on said leg portion by directing a high energy beam on said leg portion to create permanent metallurgical effect within said zone to permanently deflect the leg portion to a position at which said connected cutting means attains the predetermined gage, said zone being positioned axially intermediate the integral shank and the attachment means of said leg portion.

9. A method as recited in claim 8 further comprising:

forming a concave notch into a confronting face of each bit segment extending generally in alignment with the dome edge and spaced generally axially from the dome edge.

10. A method as recited in claims 7 or 9 further comprising:

deflecting each leg portion to a position at which said cutting means attains the desired gage by fusing the confronting faces along the dome edge.

11. A method as recited in claims 7 or 9 wherein the amount of material between the notch and the dome edge is predetermined to assure substantially complete fusion thereover by a high energy beam.

12. A method of assembling a rotary drill bit comprising:

forming a plurality of bit segments, each bit segment adapted to be integrally adjoined to at least one other bit segment to form the drill bit, each bit segment comprising a shank portion, a leg portion extending from the shank portion, and cutter means operatively attached to the leg portion, the cutter means including gage cutting elements;

forming confronting faces on the shank portion of each bit segment, said confronting faces being adapted for abutting with confronting faces formed on the shank portions of each adjoining bit segment;

forming the confronting surfaces on the shank portions of each bit segment in a predetermined relation to extend substantially parallel to the rotational axis of the drill bit formed by the integral assembly of bit segments;

abutting the confronting faces of the shank portions of a plurality of bit segments necessary to form a complete rotary drill bit assembly;

aligning the abutted confronting faces of the shank portions of the bit segments in a generally parallel alignment with the rotational axis of said drill bit;

fusing the bit segments together at the confronting faces by directing a high energy beam over at least a portion of the confronting faces while aligned parallel to the rotational axis of said drill bit; and adjusting the cutting means operatively attached to the leg portion of at least one bit segment to a predetermined desired gage by fusing material in a zone on said leg portion, the material of said zone being fused by directing a high energy beam on the material of said zone.

13. A method of assembling a rotary drill bit comprising:

forming a plurality of bit segments, each bit segment adapted to be integrally adjoined to at least one other bit segment to form the drill bit, each bit segment comprising a shank portion, a leg portion extending from the shank portion, and cutter means operatively attached to the leg portion, the cutter means including gage cutting elements;

forming confronting faces on the shank portion of each bit segment, said confronting faces being adapted for abutting with confronting faces formed on the shank portions of each adjoining bit segment;

forming the confronting surfaces on the shank portions of each bit segment in a predetermined relation to extend substantially parallel to the rotational axis of the drill bit formed by the integral assembly of bit segments;

abutting the confronting faces of the shank portions of a plurality of bit segments necessary to form a complete rotary drill bit assembly;

aligning the abutted confronting faces of the shank portions of the bit segments in generally parallel alignment with the rotational axis of said drill bit;

fusing the bit segments together at the confronting faces by directing a high energy beam over at least a portion of the confronting faces;

elastically deflecting each leg portion to position its attached cutter means at the predetermined gage; and thereafter;

adjusting the cutting means operatively attached to the leg portion of at least one bit segment to a predetermined gage by fusing material in a zone on said leg portion, the material of said zone being fused by directing a high energy beam on the material of said zone.

14. A method as recited in claim 13 wherein the operation of elastically deflecting each leg portion comprises:

applying a radial force to each leg portion.

15. A method as recited in claim 13 wherein the abutting confronting faces of the shank portions of the bit segments define longitudinal edges extending essentially longitudinally of said drill bit and dome edges extending generally transversely of the bit axis, said method further comprising:

first, fusing the material at the abutting confronting faces along the longitudinal edges, second, elastically deflecting at least one leg portion, third, fusing the zone of material in the deflected leg portion, and fourth, fusing the material at the abutting confronting faces along the dome edges.

16. A method as recited in claim 13 wherein the abutting confronting faces of the shank portions of the bit segments define longitudinal edges extending essentially longitudinally of said drill bit and dome edges extending generally transversely of the bit axis, said method further comprising:

first, fusing the material at the abutting confronting faces along the longitudinal edges, second, elastically deflecting at least one leg portion, third, fusing the material at the abutting confronting faces along the dome edges, the three aforementioned steps being accomplished prior to fusing the zone of material in the leg portion.

17. A method of assembling a rotary drill bit comprising:

forming a plurality of bit segments, each bit segment adapted to be integrally adjoined to at least one other bit segment to form the drill bit, each bit segment comprising a shank portion, a leg portion extending from the shank portion, and cutter means operatively attached to the leg portion, the cutter means including gage cutting elements;

forming confronting faces on the shank portion of each bit segment, said confronting faces being adapted for abutting with confronting faces formed on the shank portions of each adjoining bit segment;

forming the confronting surfaces on the shank portions of each bit segment in a predetermined relation to extend substantially parallel to the rotational axis of the drill bit formed by the integral assembly of bit segments;

abutting the confronting faces of the shank portions of a plurality of bit segments necessary to form a complete rotary drill bit assembly, the abutting confronting faces of the bit segments defining longitudinal edges extending generally longitudinally of said drill bit and dome edges extending generally transversely of the bit axis;

aligning the abutted confronting faces of the shank portions of the bit segments in generally parallel alignment with the rotational axis of said drill bit;

fusing the bit segments together at the confronting faces by directing a high energy beam over at least a portion of the confronting faces;

adjusting the cutting means operatively attached to the leg portion of at least one bit segment to a predetermined desired gage by fusing material in a zone on said leg portion, the material of said zone being fused by directing a high energy beam on the material of said zone; and said method further comprising:

fusing the material of the abutting confronting faces along the longitudinal edges, fusing the zone of material in at least one leg portion, and fusing the material of the abutting confronting faces along the dome edges.

18. A method of assembling a rotary drill bit comprising:

forming a plurality of bit segments, each bit segment adapted to be integrally adjoined to at least one other bit segment to form the drill bit, each bit segment comprising a shank portion, a leg portion extending from the shank portion, and cutter means operatively attached to the leg portion, the cutter means including gage cutting elements;

forming confronting faces on the shank portion of each bit segment, said confronting faces being adapted for abutting with confronting faces formed on the shank portions of each adjoining bit segment;

forming the confronting surfaces on the shank portions of each bit segment in a predetermined relation to extend substantially parallel to the rotational axis of the drill bit formed by the integral assembly of bit segments;

providing a positioning fixture to position, abut and align said bit segments during assembly of said drill bit;

abutting the confronting faces of the shank portions of a plurality of bit segments necessary to form a complete rotary drill assembly;

aligning the abutted confronting faces of the shank portions of the bit segments in generally parallel alignment with the rotational axis of said drill bit;

fusing the bit segments together at the confronting faces by directing a high energy beam over at least a portion of the confronting faces;

associating force applying means with said positioning fixture, said force applying means applying deflecting force to said leg portions; and adjusting the cutting means operatively attached to the leg portion of at least one bit segment to a predetermined desired gage by fusing material in a zone on said leg portion, the material of said zone being fused by directing a high energy beam on the material of said zone.

19. A method of permanently positioning cutting means on a rotary drill bit at a predetermined gage as part of manufacturing the rotary drill bit; said drill bit comprising a plurality of bit segments of metallic material; each bit segment comprising a shank portion forming part of an integral shank of the assembled drill bit, and a leg portion extending longitudinally from the shank portion, and attachment means operatively connecting said cutting means to said leg portion, each bit segment further comprising confronting faces on the shank portion adapted to abut corresponding confronting faces on another adjoining bit segment; said method comprising:

fusing the bit segments together over at least a portion of the confronting faces by directing a high energy beam over the abutting confronting faces of adjoining bit segments;

forming a threaded end connection on the integral shank of the drill bit; and thereafter;

fusing the metallic material in a zone on said leg portion by directing a high energy beam on said leg portion, said zone extending inward from a surface of said leg portion and extending circumferentially within at least a portion of said leg portion, said zone further being positioned axially intermediate the shank and the attachment means, said fused zone of metal creating a permanent metallurgical effect within said zone to permanently deflect the leg portion to a position at which said connected cutting means attains the predetermined gage.

20. A method of assembling a rotary drill bit comprising:
forming a plurality of bit segments, each bit segment adapted to be integrally adjoined to at least one other bit segment to form the drill bit, each bit segment comprising a shank portion, a leg portion extending from the shank portion, and cutter means operatively attached to the leg portion, the cutter means including gage cutting elements;
forming confronting faces on the shank portion of each bit segment, said confronting faces being adapted for abutting with confronting faces formed on the shank portions of each adjoining bit segment;
forming the confronting surfaces on the shank portions of each bit segment in a predetermined relation to extend substantially parallel to the rotational axis of the drill bit formed by the integral assembly of bit segments;
abutting the confronting faces of the shank portions of a plurality of bit segments necessary to form a complete rotary drill bit assembly;
aligning the abutted confronting faces of the shank portions of the bit segments in generally parallel alignment with the rotational axis of said drill bit;
fusing the bit segments together at the confronting faces by directing a high energy beam over at least a portion of the confronting faces;
forming a threaded end connection on the shank portions of the plurality of fused together bit segments; and thereafter;
adjusting the cutting means operatively attached to the leg portion of at least one bit segment to a predetermined gage by fusing material in a zone on said leg portion, the material of said zone being fused by directing a high energy beam on the material of said zone.

21. A method as recited in claims 19 or 20 further comprising:
retaining the drill bit by the threaded end connection during fusing of the material in said zone.

22. A method as recited in claims 19 or 20 further comprising:
adjusting the cutting means in predetermined referenced relation to the threaded end connection during fusing of the material in said zone.

* * * * *